(12) United States Patent
Polland et al.

(10) Patent No.: US 7,869,464 B2
(45) Date of Patent: Jan. 11, 2011

(54) CROSS-LINK

(75) Inventors: Joe Polland, Eden Prairie, MN (US);
Manish Kumar Sharma, Eden Prairie, MN (US); Xinkuan Zhou, Eden Prairie, MN (US); Fu-Chin Yang, Beijing (CN)

(73) Assignee: ADC DSL Systems, Inc., Eden Prairie, MN (US)

( * ) Notice: Subject to any disclaimer, the term of this patent is extended or adjusted under 35 U.S.C. 154(b) by 270 days.

(21) Appl. No.: 12/036,678

(22) Filed: Feb. 25, 2008

(65) Prior Publication Data

US 2008/0205449 A1    Aug. 28, 2008

Related U.S. Application Data

(60) Provisional application No. 60/892,035, filed on Feb. 28, 2007.

(51) Int. Cl.
*H04J 3/00* (2006.01)
(52) U.S. Cl. ....................................................... 370/498
(58) Field of Classification Search ................... 370/498
See application file for complete search history.

(56) References Cited

U.S. PATENT DOCUMENTS 6,741,701 B1 * 5/2004 Barak et al. ............ 379/406.01

2003/0012184 A1 * 1/2003 Walker, III et al. .......... 370/352
2008/0019501 A1 * 1/2008 Miller et al. ................. 379/412

OTHER PUBLICATIONS

Rup et al., "SHDSL Technology Complementing Other Transport Technologies", EUROCON 2003,Computer as a Tool. The IEEE Region 8 , vol. 1, No., pp. 229-232 vol. 1, Sep. 22-24, 2003.*

* cited by examiner

*Primary Examiner*—Albert T Chou
(74) *Attorney, Agent, or Firm*—Fogg & Powers LLC

(57) ABSTRACT

A communication network comprises a first digital subscriber line (DSL) unit having a plurality of application ports and at least one DSL port; and a second DSL unit having a plurality of application ports and at least one DSL port; wherein the first DSL unit is communicatively coupled to the second DSL unit via a DSL pair coupled to the at least one DSL port in each of the first and second DSL units; and wherein each of the first and second DSL units are configured to receive a signal of a first interface format over one of the plurality of application ports, extract timeslots from the received first interface format signal, transmit the timeslots over the at least one DSL port, and use timeslots received over the at least one DSL port to generate at least one second signal of a dissimilar interface format.

29 Claims, 8 Drawing Sheets

| 1:1 Cross Connect Summary | |
|---|---|
| 1st Unit Port | 2nd Unit Port |
| G.703 | Nx64k |
| G.703 | Ethernet |
| Nx64k | G.703 |
| Nx64k | Ethernet |
| Ethernet | G.703 |
| Ethernet | Nx64k |

Figure 2

| N:1 Cross Connect Summary | |
|---|---|
| 1st Unit Port | 2nd Unit Port |
| G.703 or Nx64k | G.703 + Nx64k |
| G.703 or Nx64k | Ethernet + Nx64k |
| G.703 or Nx64k | G.703 + Ethernet |
| G.703 or Nx64k | G.703 + Ethernet + Nx64k |
| G.703 + Nx64k | G.703 or Nx64k |
| Ethernet + Nx64k | G.703 or Nx64k |
| G.703 + Ethernet | G.703 or Nx64k |
| G.703 + Ethernet + Nx64k | G.703 or Nx64k |

Figure 3

CROSS-LINK

CROSS-REFERENCE TO RELATED APPLICATIONS

This application is related to U.S. provisional patent application Ser. No. 60/892,035, filed Feb. 28, 2007 entitled "CROSS-LINK," hereby incorporated herein by reference. The present application hereby claims priority, under 35 U.S.C. §119(e), to U.S. Provisional Patent Application No. 60/892,035.

This application is related to co-pending U.S. patent application Ser. No. 12/036,663, filed on even date herewith, entitled "MEDIA CONVERTER", hereby incorporated herein by reference, and referred to herein as the "'823 Application".

This application is related to co-pending U.S. patent application Ser. No. 12/036,664, filed on even date herewith, entitled "POINT TO MULTIPOINT CROSS-LINK", hereby incorporated herein by reference, and referred to herein as the "'822 Application".

BACKGROUND

A typical digital subscriber line (DSL) communication network consists of a local unit and remote units, connected together by DSL. Each unit can be equipped with various application interfaces such as G.703, Ethernet, and Nx64k. The application interface formats are transported between units over DSL pairs, such as over G.SHDSL (G.991.2) interfaces. In this manner a user is able to connect interfaces of the same type on different units. For example, a G.703 interface on a local unit may be connected to a G.703 interface on a remote unit.

SUMMARY

In one embodiment a communication network is provided. The communication network comprises a first digital subscriber line (DSL) unit having a plurality of application ports and at least one DSL port; and a second DSL unit having a plurality of application ports and at least one DSL port; wherein the first DSL unit is communicatively coupled to the second DSL unit via a DSL pair coupled to the at least one DSL port in each of the first and second DSL units; and wherein each of the first and second DSL units are configured to receive a signal of a first interface format over one of the plurality of application ports, extract timeslots from the received first interface format signal, transmit the timeslots over the at least one DSL port, and use timeslots received over the at least one DSL port to generate at least one second signal of a dissimilar interface format.

In another embodiment, a digital subscriber line (DSL) unit is provided. The DSL unit comprises a plurality of application ports; at least one DSL port, wherein the DSL unit is configured to receive a signal of a first interface format over one of the plurality of application ports, extract timeslots from the received first interface format signal, transmit the timeslots over the at least one DSL port, and use timeslots received over the at least one DSL port to generate at least one second signal of a dissimilar interface format.

In yet another embodiment, a method of communicating in a network is provided. The method comprises receiving a signal at a first digital subscriber line (DSL) unit via an application port using a first interface format; extracting timeslots from the first interface format signal; inserting extracted timeslots into a DSL frame; transmitting the DSL frame to a second DSL unit; extracting timeslots from the DSL frame in the second DSL unit; and using timeslots to generate at least one second signal of a dissimilar interface format in the second DSL unit.

DRAWINGS

FIG. 2 is a table of one-to-one port relationships according to one embodiment of the present invention.

FIG. 3 is a table of N-to-one port relationships according to one embodiment of the present invention.

DETAILED DESCRIPTION

Figure 1A:
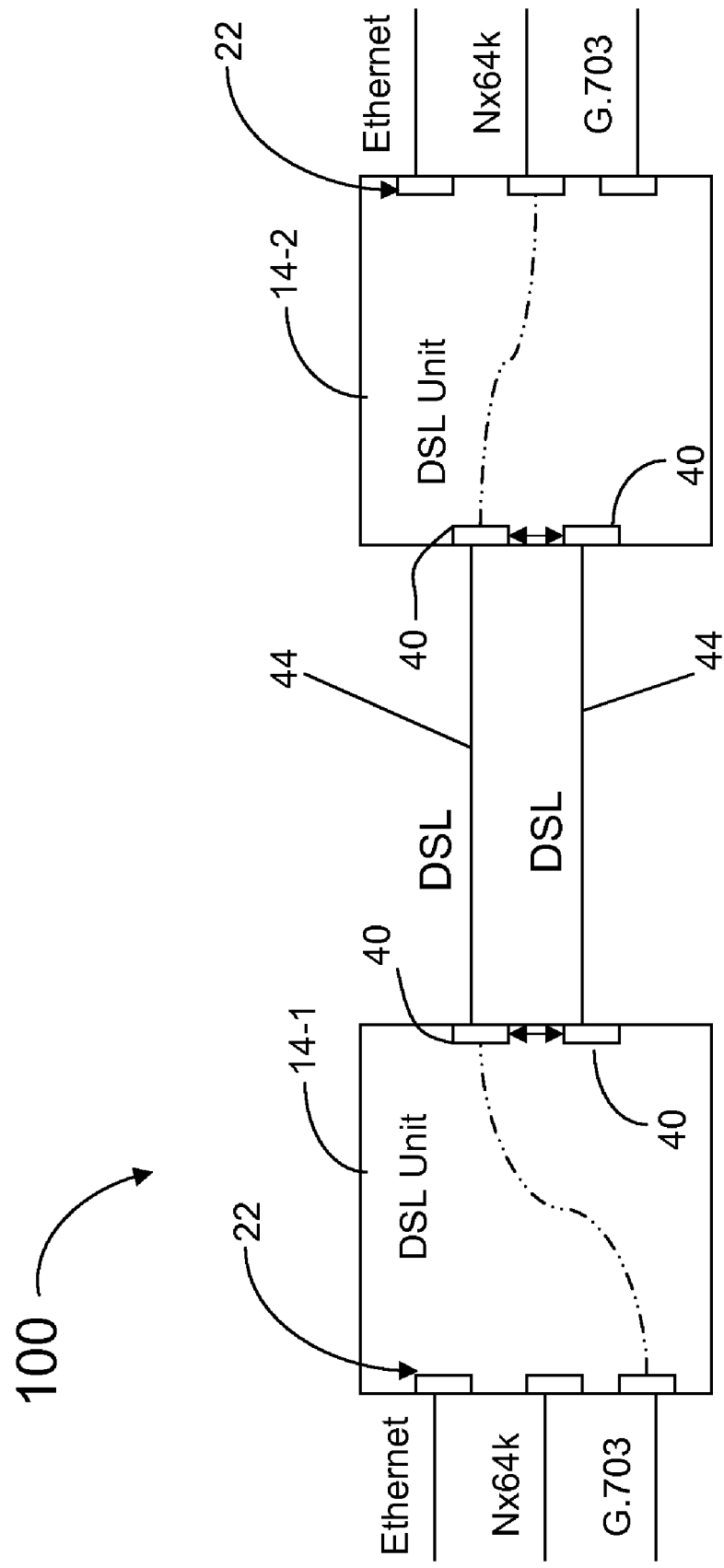
FIGS. 1A and 1B are a block diagram of a communication network according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention enable more flexibility in a DSL communication network by allowing a user to connect different interface types to each other. For example, a local G.703 interface can be connected to a remote Ethernet interface. Ethernet is a local area network technology. Therefore, when connecting a remote Ethernet port to a local G.703 port, the user is able to distribute the Ethernet to a remote location using the telephone network, or other mechanisms available to distribute G.703 remotely. Hence, more flexibility is enabled in embodiments of the present invention than in a typical DSL communication network.

Figure 1B:
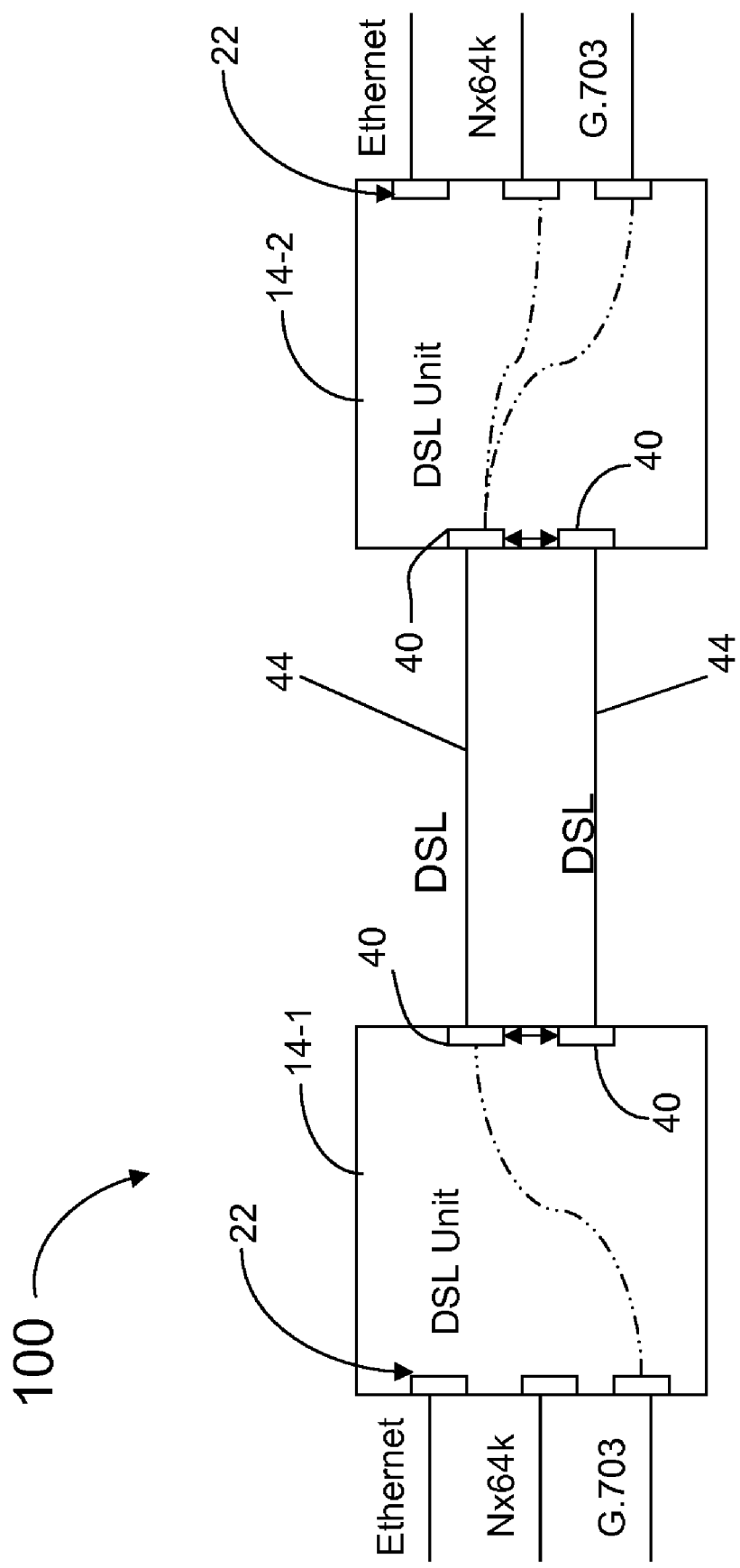

FIGS. 1A and 1B are block diagrams of a communication network 100 according to one embodiment of the present invention. Network 100 includes two DSL units 14-1 and 14-2. DSL units 14-1 and 14-2 are communicatively coupled together via two DSL pairs 44 connected to a respective DSL port 40 in each of DSL units 14-1 and 14-2. As indicated by the arrows between the two DSL ports 40 in each DSL unit, network 100 is operating in M-pair mode, where M represents the number of DSL pairs. In M-pair mode, DSL pairs 44 effectively create an aggregate bandwidth. For example, in some embodiments each DSL pair has a bandwidth of 2.3 Mbits creating an aggregate bandwidth of 4.6 Mbits in embodiments with two DSL pairs. However, network 100 can operate in other modes in other embodiments, such as single-pair mode or protection mode.

In this embodiment, each of DSL units 14-1 and 14-2 are configured according to the Global.standard High-Bit-Rate Digital Subscriber Line (G.SHDSL) standard. For example, an exemplary DSL unit according to embodiments of the present invention is the WorldDSL™ G.SHDSL modem manufactured by ADC, Inc. In addition, in this embodiment, DSL unit 14-1 is configured as a central unit (also known as an STU-C or ATU-C) while DSL unit 14-2 is configured as a remote unit (also known as an STU-R or ATU-R).

Each of DSL units 14-1 and 14-2 has three application ports 22 in the example in FIG. 1. Each application port is configured for a different interface format. For example, in this embodiment the three interface formats used are G.703, Nx64k, and Ethernet. However, other interface formats can be used in other embodiments. The interface format G.703 is an International Telecommunication Union Telecommunication (ITU-T) standard for transmitting voice or data over digital carriers such as T1 and E1. G.703 provides the specifications for pulse code modulation. In one implementation of this embodiment, G.703 is sent over balanced 120 ohm twisted pair cables terminated in RJ-45 jacks. In addition, G.703 can operate in one of two modes: structured and unstructured. The structured mode is a frame format having a specified length for the timeslots. The unstructured mode is a continuous bit stream of 2 Mbytes.

The Nx64k interface format is a timeslot based format, which is configured with rates up to 178 timeslots. Nx64k is a generic term and an application port for Nx64k format can be configured according to V.35, V.36, X.21, or RS-530 standards. The Ethernet format used in this embodiment is 10/100 Base T Ethernet format. Additionally, the Ethernet application port is either full or half duplex and is configured using auto negotiation and auto-medium-dependent-interface (MDI)/MDI-x. In one implementation of this embodiment, the Ethernet application port is manually configured.

In conventional networks, an application port in a central unit is communicatively coupled only to a similar application port using the same interface format in a remote unit. However, in embodiments of the present invention an application port in DSL unit 14-1 is communicatively coupled to one or more dissimilar application ports in DSL unit 14-2. For example, in FIG. 1A, a G.703 interface application port in DSL unit 14-1 is communicatively coupled to an Nx64K interface application port in DSL unit 14-2. Alternatively, in FIG. 1B, a G.703 interface application port in DSL unit 14-1 is communicatively coupled to both an Nx64K interface application port and an Ethernet interface application port in DSL unit 14-2. Exemplary one-to-one cross connects available in embodiments of the present invention, such as the cross connect in FIG. 1A, are shown in the table in FIG. 2. Similarly, exemplary N-to-one cross connects, such as the cross connect in FIG. 1B, are shown in the table in FIG. 3.

In enabling a cross connect, DSL units 14-1 and 14-2 are configured to allocate bandwidth of the DSL pairs 44 according to the interface formats of application ports 22. In particular, in a one-to-one cross connect, the bandwidth allocated to the application port 22 of DSL unit 14-1 is the same as the bandwidth allocated to the coupled application port 22 of DSL unit 14-2. In an N-to-one cross connect, the aggregate bandwidth allocated to the plurality of application ports 22 in one of DSL units 14 is the same as the bandwidth allocated to the corresponding application port in the other DSL unit 14.

In converting an Ethernet signal to a signal of a different interface format, such as Nx64k or G.703, DSL units 14-1 and 14-2 strip the Ethernet signal of the sync bytes and the start of frame byte. The stripped Ethernet frame is high-level data link control (HDLC) encoded. HDLC encoding involves appending a two byte cyclic redundancy check (CRC) using the polynomial $X_{16}+X_{12}+X_5+1$. The Ethernet frame plus CRC is then examined for a continuous bit sequence of five 1's (that is, 11111). A zero is inserted at the end of each sequence of five 1's (that is, 111110). HDLC flags with the pattern "01111110" are also inserted at the beginning and end of the frame. Zero insertion after a sequence of five Is in the payload is used to avoid confusion of payload with HDLC flags. The HDLC flags are used to identify the start and end of a frame. The HDLC encoded Ethernet frame is then inserted into timeslots to convert to Nx64 or G.703 interface formats. In the reverse direction, the HDLC flags are removed from the start and end of the frame. Similarly, the inserted "0" in the sequence "111110" is removed as well as the appended two byte CRC. The remaining Ethernet frame is then formatted with start of frame and sync bytes in an application port 22 configured for Ethernet signals and transmitted.

In converting a structured G.703 signal to a different interface format, DSL units 14-1 and 14-2 remove the timeslot 0 in a structured G.703 frame. The timeslot is regenerated in the reverse direction when transmitting a G.703 frame over a corresponding application port 22. Also, in some embodiments, DSL units 14-1 and 14-2 disable timeslot 16 of a structured G.703 in order to use the timeslot for payload rather than being used for signaling as in a typical G.703 frame.

After making the applicable adjustments discussed above, DSL units 14-1 and 14-2 convert data from one interface format to another through timeslot range mapping. Timeslot range mapping maps a timeslot of one interface format to a corresponding timeslot in a second interface format. In addition, fractional timeslot mapping is used in some embodiments. For example, if 10 timeslots are configured, G.703 timeslots 1-10 are mapped with Nx64k timeslots 1-10. If fractional timeslots are specified, a user may define matching ranges. For example, G.703 timeslots 1-5 mapped to Nx64k timeslots 6-10. In a one-to-one cross connect, an unstructured G.703 signal is configured with a set bandwidth to match the bandwidth of the interface format to which the G.703 signal is mapped. However, unstructured G.703 signals are not used in an N-to-one cross connect.

If G.703 timeslot 16 is disabled in structured mode as described above, then G.703 timeslots 1-31 may be connected to Nx64k timeslots 1-31. If G.703 timeslot 16 is enabled, G.703 timeslots 1-15 may be connected to Nx64k timeslots 1-15, and G.703 timeslots 17-31 to Nx64k timeslots 16-30. In addition, in an N-to-one cross connect, mapped timeslots are shared between the plurality of interface formats. For example, in FIG. 1B, application port 22 for G.703 in DSL unit 14-1 is coupled to an Nx64k interface application port and an Ethernet interface application port in DSL unit 14-2. In this example, the first 10 timeslots are mapped to the Ethernet interface and the next 20 time slots are mapped to the Nx64k timeslot interface.

In operation for a one-to-one cross connect, DSL unit 14-1 receives a signal over an application port 22 having a first interface format (for example, G.703). DSL unit 14-1 extracts timeslots and terminates the signal. The extracted timeslots are then transported as payload over DSL pairs 44 to DSL unit 14-2. DSL unit 14-2 passes the extracted timeslots to the appropriate application port 22 configured for a second interface format (for example, Nx64k). The extracted timeslots are used to create a new signal of the second interface format. The new signal originates at and is transmitted from the corresponding application port 22. In the reverse direction, a similar process occurs. In particular, DSL unit 14-2 receives a signal in the second interface format over the corresponding application port 22. DSL unit 14-2 extracts timeslots and terminates the signal in the second interface format application port. DSL unit 14-2 then transports the extracted timeslots as payload over DSL pairs 44 to DSL unit 14-1. DSL unit 14-1 passes the converted signal to the corresponding application port 22 for the first interface format. The extracted timeslots are used to create a signal of the first interface format and transmitted over the corresponding application port 22.

In operation of an N-to-one cross connect as in FIG. 1B, DSL unit 14-1 receives a structured G.703 signal and removes timeslot 0. DSL unit 14-1 then extracts timeslots from the G.703 signal and transports the extracted timeslots to DSL unit 14-2. As stated above, in this N-to-one cross connect the bandwidth allocated the G.703 signal is shared between the plurality of interface formats to which the G.703 signal is converted. DSL unit 14-2 is configured to divide the extracted timeslots appropriately and map the timeslots to the other formats. In this example, 30 total timeslots are used from the G.703 signal where DSL unit 14-2 maps the first 10 timeslots to an Ethernet interface and the next 20 timeslots to an Nx64k interface. Notably, the timeslot divisions are provided by way of example and not by way of limitation. In particular, it is to be understood that a user can configure how to divide the timeslots between the second interface formats to which the original signal is to be converted. At the corresponding interfaces, the extracted timeslots are converted to a signal of a second interface format and transmitted.

Figure 4:
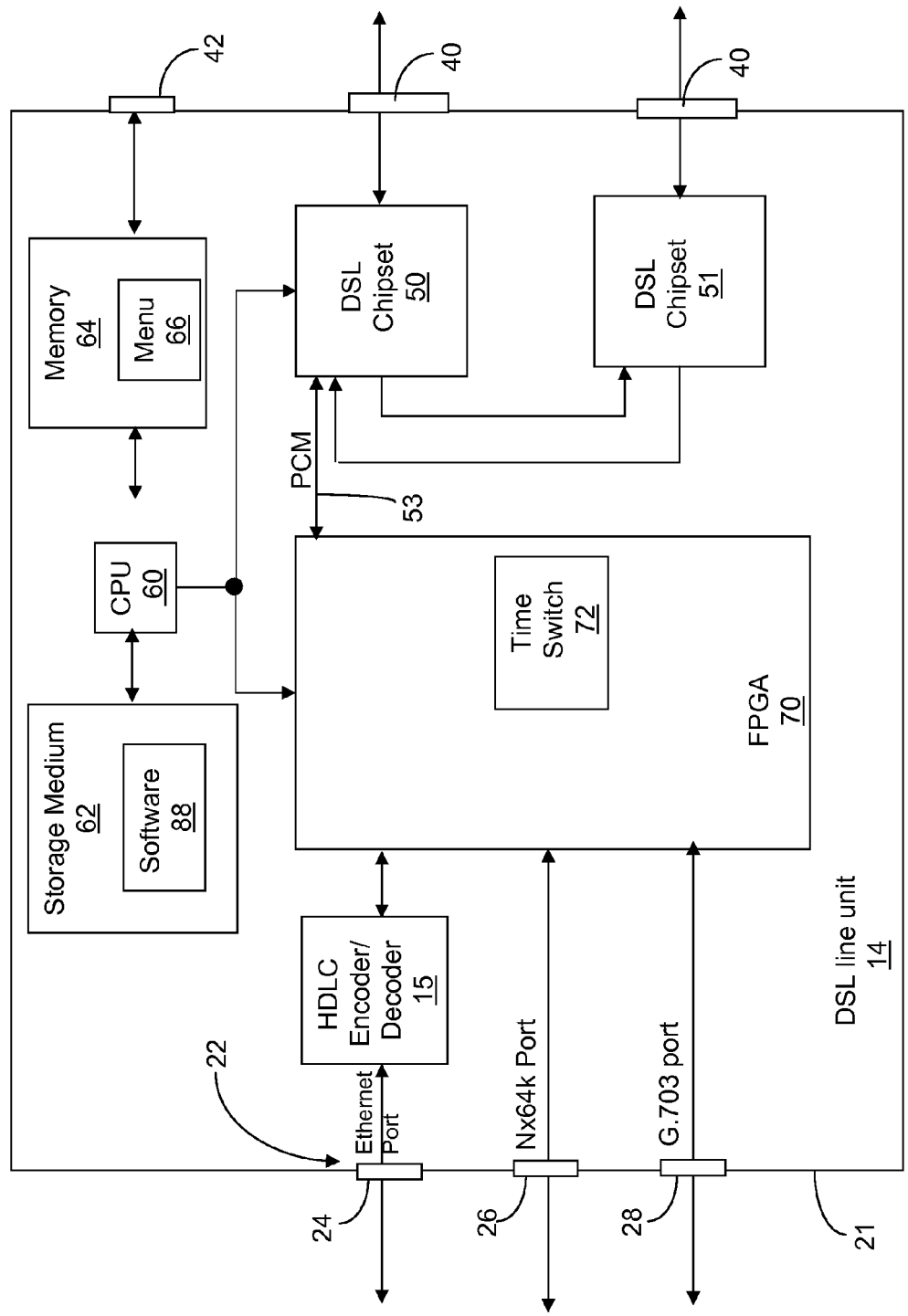
FIG. 4 is a block diagram of a DSL unit according to one embodiment of the present invention.

FIG. 4 is a block diagram of a DSL unit 14 according to one embodiment of the present invention. DSL unit 14 is used in a communication network such as network 100. DSL unit 14 includes a plurality of different types of application ports represented generally by the numeral 22. Specifically, there are three application ports 22, in this example, on the user interface side 21 and two DSL ports 40 each coupled to a DSL pair as in FIG. 1. Each application port is configured for a different interface format. In particular, application port 24 is configured for an Ethernet format, application port 26 is configured for an Nx64k format, and application port 28 is configured for a G.703 format.

The input from the DSL ports 40 is sent to a respective DSL chipset 50 or 51. In this embodiment, DSL ports 40 are configured for G.SHDSL and chipsets 50 and 51 are G.SHDSL chipsets. The DSL chipsets 50 and 51 are coupled in a cascaded configuration in this example. This cascaded configuration enables DSL unit 14 to operate in M-pair mode where the DSL pairs coupled to DSL ports 40 create and aggregate bandwidth. A pulse code modulation (PCM) interface 53 couples the DSL chipset 50 to a custom field programmable gate array (FPGA) 70.

The plurality of application ports 22 and the DSL ports 40 are connected via the DSL chipset 50 and the FPGA 70. Notably, although an FPGA is used in this example, embodiments of the present invention are not to be so limited. For example, in other embodiments, an application specific integrated circuit (ASIC) can be used.

The FPGA 70 and the DSL chipsets 50 and 51 are controlled by a central processing unit 60, which is responsible for configuration, status and error handling of the DSL unit 14. The FPGA 70 is the functional block responsible for handling timeslot allocation, and switching of timeslots between interface formats of the plurality of ports 22. A time switch 72 controls the time slot allocation as directed by the central processing unit 60.

In addition, an HDLC encoder/decoder 15 is provided between the Ethernet port 24 and the FPGA 70 to HDLC encode/decode an Ethernet signal. When an Ethernet frame is input at the Ethernet port 24, the frame is passed to HDLC encoder/decoder 15 where the sync byte and start of frame byte of the Ethernet frame are removed to form a stripped Ethernet port. The HDLC encoder/decoder 15 also appends a two byte CRC to the stripped Ethernet frame. HDLC flags with the pattern "01111110" are also inserted at the beginning and end of the frame.

Figure 5:
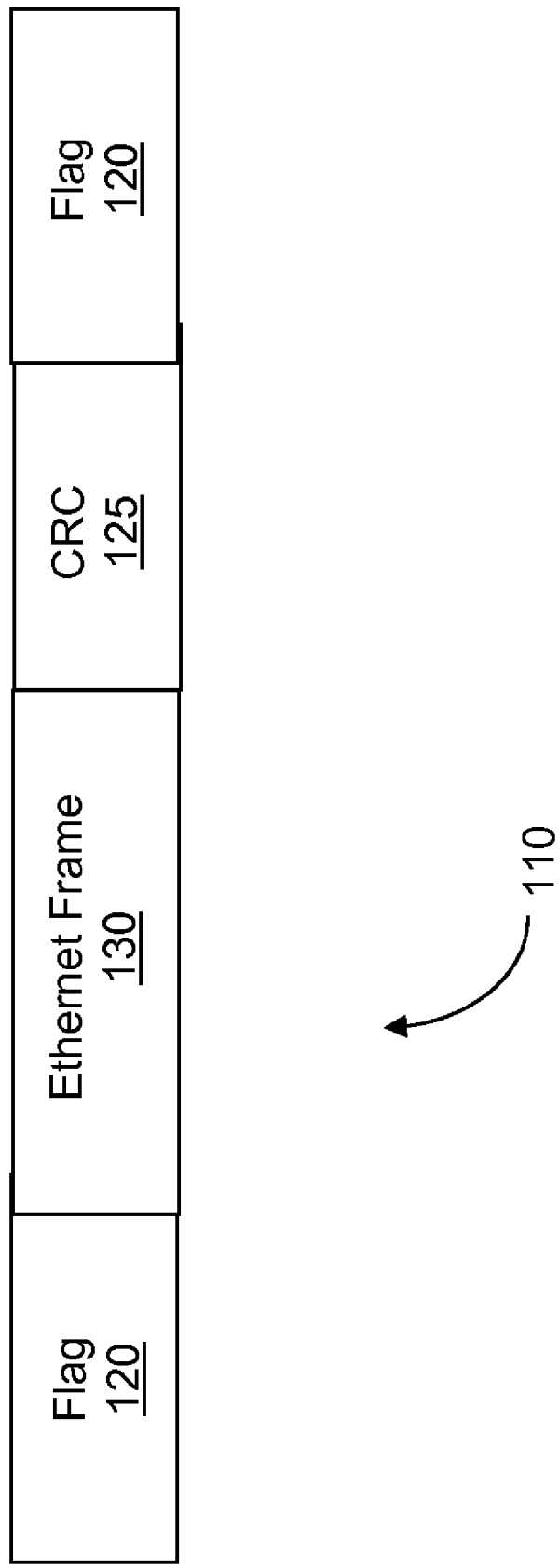
FIG. 5 shows one embodiment of the data structure of the high-level data link control encoding.

FIG. 5 shows one embodiment of the data structure 110 of the HDCL encoding. The data structure 110 includes the flag 120 which is one binary byte 01111110. The CRC 125 is 16 bits long and is created using the polynomial X16+X12+X5+1. The Ethernet frame 130 and the cyclic redundancy check 125 are bitwise checked. If a contiguous sequence of five ones (11111) are found, a zero is inserted so that no pattern between the start of the Ethernet frame 130 and the end of cyclic redundancy check 125 can resemble a flag (01111110). This prevents erroneous detection of flags within the Ethernet frame 130 or cyclic redundancy check 125. The HDLC flags are used to identify the start and end of a frame. The HDLC encoder/decoder 15 then inserts the encoded frame into a time division multiplex (TDM) byte stream and passes the TDM stream to FPGA 70.

Likewise, when a frame is prepared for egress from the DSL unit 14 via the Ethernet port 24, FPGA 70 extracts the corresponding timeslots from a PCM stream received from chipsets 50 and 51 and passes the timeslots to HDLC encoder/decoder 15 in a TDM byte stream. The TDM byte stream is examined in the HDLC encoder/decoder 15 for HDLC frames by searching for HDLC flags. When a frame is detected, HDLC encoder/decoder 15 removes the HDLC flags from the start and end of the frame. Similarly, the inserted "0" in the sequence "111110" is removed as well as the appended two byte CRC in HDLC encoder/decoder 15. Before removal, the CRC is used for error detection. HDLC encoder/decoder 15 then prepends the start of frame and sync bytes to the frame and passes the Ethernet frame to Ethernet port 24 where the frame is transmitted.

Once FPGA 70 allocates timeslots to the signals from application ports 22, the timeslots are passed to DSL chipsets 50 and 51 via PCM interface 53. The timeslots are modulated and transmitted via DSL chipsets 50 and 51 over DSL pairs to another DSL unit similar to DSL unit 14. In the reverse direction, the other DSL unit transports timeslots to DSL unit 14 via DSL chipsets 50 and 51 and DSL pair 44. FPGA 70 receives the timeslots via PCM interface 53 and switches the timeslots to the appropriate application ports 22. In particular, FPGA 70 switches the timeslots based on the configured one-to-one or N-to-one cross connect. For example, in one embodiment, the PCM stream contains bytes from a G.703 interface in the other DSL unit and FPGA 70 is configured to switch a fraction of the bytes to the Ethernet port 24 and a fraction of the bytes to Nx64k port 26.

In addition, FPGA 70 is configured, in some embodiments, to terminate timeslot 0 when receiving a structured G.703 signal from G.703 port 28 and to regenerate timeslot 0 when switching timeslots to G.703 port 28. When receiving an unstructured G.703 signal from G.703 port 28, FPGA 70 begins counting bytes from the beginning of the unstructured G.703 signal. For each byte FPGA 70 allocates a timeslot. In the reverse direction, FPGA sends the bytes as a continuous stream to G.703 port 28.

A user selects a mode of operation for the DSL unit 14 and configures a cross connect with an application port in another DSL unit via a user interface 42. In one implementation of this embodiment, the user also selects a data rate for transceived signals from a menu 66 via a user interface 42. The time switch 72 is initialized by the central processing unit 60 based on the interface formats selected for the cross connect so that a selected data rate is accommodated by the DSL unit 14. A selection of data rate is provided by a user via the user interface 42.

The central processing unit 60 is communicatively coupled to a memory 64, which stores the menu 66 that includes the options for the data rate selection and the cross connect configuration. The central processing unit 60 is communicatively coupled to a storage medium 62. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The central processing unit 60 executes software 88 and/or firmware that causes the central processing unit 60 to perform at least some of the processing described herein. At least a portion of such software 88 and/or firmware executed by the central processing unit 60 and any related data structures are stored in storage medium 62 during execution. Memory 64 comprises any suitable memory now known or later developed such as, for example, random access memory (RAM), read only memory (ROM), and/or registers within the central processing unit 60. In one implementation, the central processing unit 60 comprises a microprocessor or microcontroller. Moreover, although the central processing unit 60 and memory 64 are shown as separate elements in FIG. 3A, in one implementation, the central processing unit 60 and memory 64 are implemented in a single device (for example, a single integrated-circuit device). The software 88 and/or firmware executed by the central processing unit 60 comprises a plurality of program instructions that are stored or otherwise embodied on a storage medium 62 from which at least a portion of such program instructions are read for execution by the central processing unit 60. In one implementation, the central processing unit 60 comprises processor support chips and/or system support chips such as ASICs.

Figure 6:
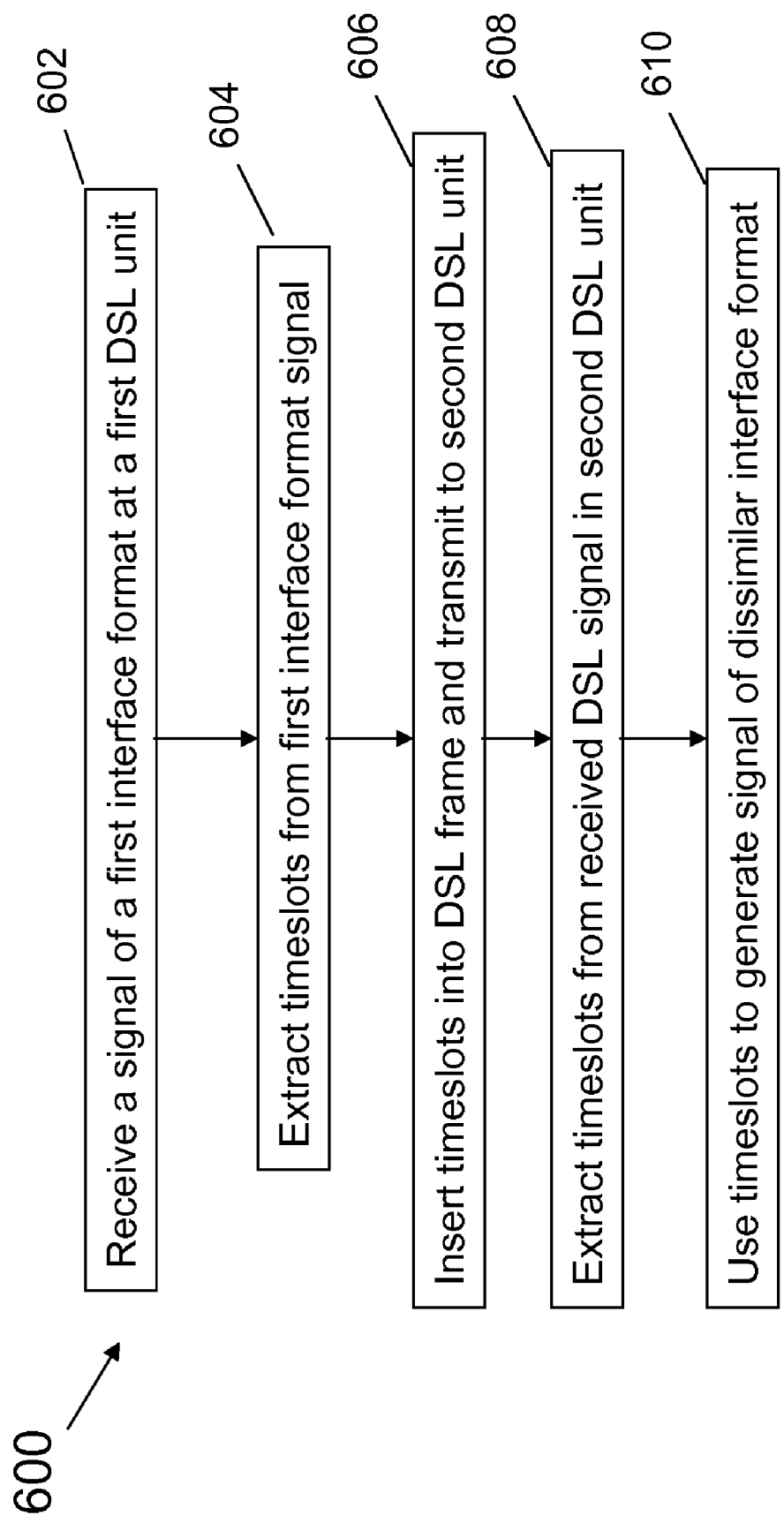
FIG. 6 is a flow chart depicting a method of communication in a network according to one embodiment of the present invention.

FIG. 6 is a flow chart depicting a method 600 of communicating in a network according to one embodiment of the present invention. Method 600 is used in a network such as network 100 above. At 602, a signal of a first interface format (for example, G.703, Nx64k, or Ethernet) is received at a first DSL unit via a corresponding application port (for example, application ports 22). At 604, the first DSL unit extracts timeslots from the first interface format signal. The number of timeslots extracted depends on the user selected data rate. In addition, with regards to a structured G.703 frame, in some embodiments, timeslot 16 is disabled and used for payload. Furthermore, extracting the correct number of timeslots from a structured G.703 frame includes terminating timeslot 0 in some embodiments. Extracting timeslots from an Ethernet signal involves various processes. An exemplary method of extracting timeslots from an Ethernet signal is shown in FIG. 7.

At 606, the first DSL unit inserts the extracted timeslots into a DSL frame and transmits the DSL frame to a second DSL unit. In this embodiment, the first DSL unit transmits the DSL frame according to the G.SHDSL standard. At 608, the second DSL unit receives the DSL frame and extracts the timeslots from the DSL frame. The second DSL unit then uses the timeslots, at 610, to generate at least one signal of a second dissimilar interface format as described above. In particular, the timeslots are switched to an application port of a dissimilar interface format. For example, in some embodiments, the second DSL unit regenerates timeslot 0 for generation of a structured G.703 signal from the received timeslots. Additionally, an exemplary method for generating an Ethernet signal from the received timeslots is shown in FIG. 8.

Figure 7:
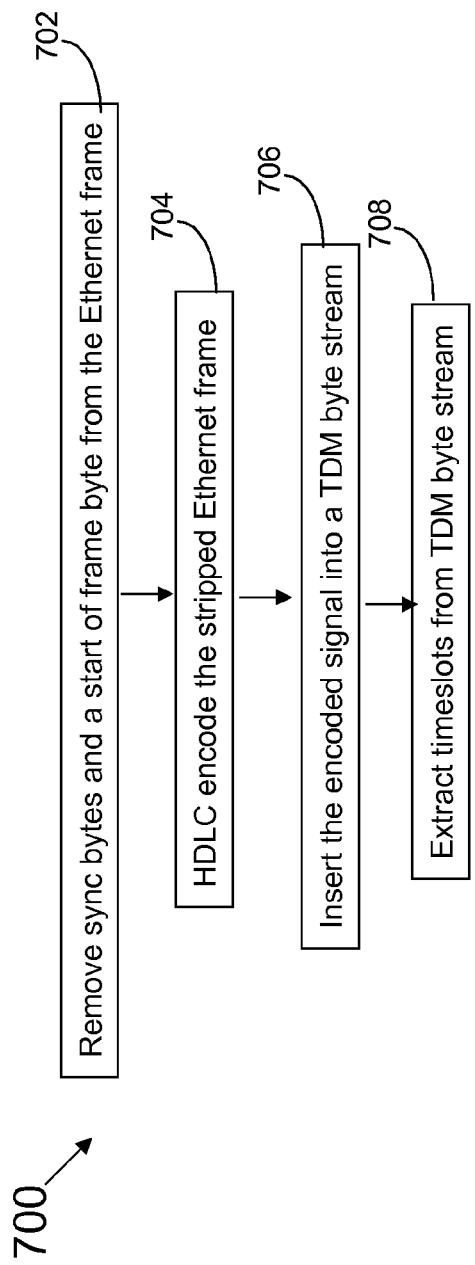
FIG. 7 is a flow chart depicting a method of extracting timeslots from an Ethernet signal in a DSL unit according to one embodiment of the present invention.

FIG. 7 is a flow chart depicting a method 700 of extracting timeslots from an Ethernet signal in a DSL unit according to one embodiment of the present invention. At 702, the sync bytes and the start of frame byte are removed from the Ethernet frame to form a stripped-Ethernet frame at 702. At 704, the stripped-Ethernet frame is HDLC encoded. HDLC encoding involves appending a two byte cyclic redundancy check (CRC) to the stripped Ethernet frame using the polynomial $X16+X12+X5+1$. The Ethernet frame plus CRC is then examined for a continuous bit sequence of five 1's (that is, 11111). A zero is inserted at the end of each sequence of five 1's (that is, 111110). HDLC flags with the pattern "01111110" are also inserted at the beginning and end of the frame. Zero insertion after a sequence of five 1s in the payload is used to avoid confusion of payload with HDLC flags. At 706, the HDLC encoded Ethernet frame is inserted into a TDM byte stream. At 708, the timeslots are extracted from the TDM byte stream.

Figure 8:
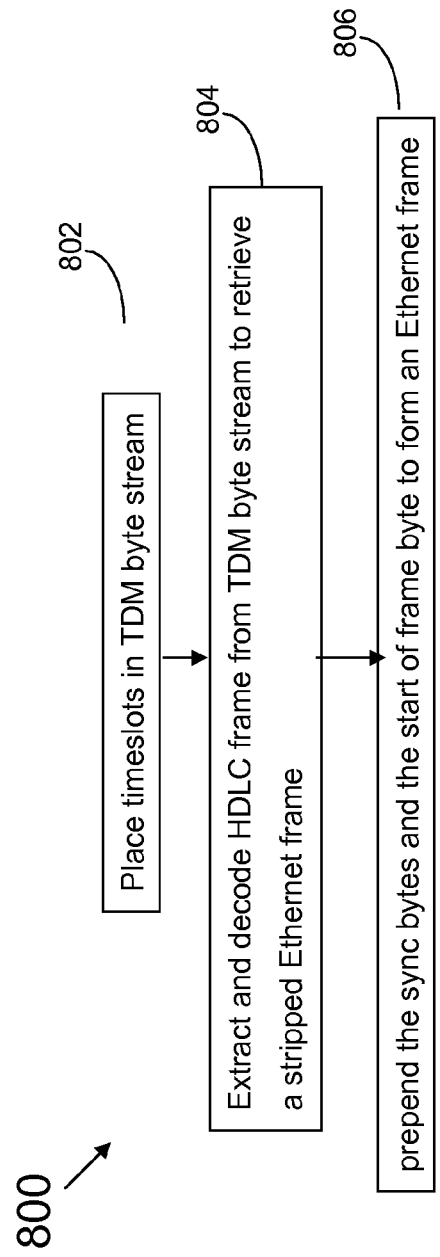
FIG. 8 is a flow chart depicting a method of generating an Ethernet signal from received timeslots in a DSL unit according to one embodiment of the present invention.

FIG. 8 is a flow chart depicting a method 800 of generating an Ethernet signal from received timeslots in a DSL unit according to one embodiment of the present invention. At 802, the received timeslots are placed in a TDM byte stream. At 804, an HDLC frame is extracted from the TDM byte stream and decoded to retrieve a stripped Ethernet frame. In particular, HDLC frames are located using HDLC flags. Decoding the HDLC frame involves removing the HDLC flags from the start and end of the frame. Similarly, a zero inserted in the sequence "111110" is removed as well as a two byte CRC to form a stripped Ethernet frame. Before removal, the CRC is used for error detection. The stripped Ethernet frame is then prepended with start of frame and sync bytes to form an Ethernet signal at 806.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication network comprising:
    a first digital subscriber line (DSL) unit having a plurality of application ports and at least one DSL port; and
    a second DSL unit having a plurality of application ports and at least one DSL port;
    wherein the first DSL unit is communicatively coupled to the second DSL unit via a DSL pair coupled to the at least one DSL port in each of the first and second DSL units; and
    wherein the first DSL unit is configured to receive a first signal of a first interface format over one of the plurality of application ports, extract timeslots from the received first signal, insert the extracted timeslots into a frame in a specific order, and transmit the timeslots in the frame over the at least one DSL port to the second DSL unit;

wherein, based on the specific order of the timeslots in the frame, the second DSL unit is configured to use the timeslots of the first signal received over the at least one DSL port from the first DSL unit to generate a second signal of a second interface format and a third signal of a third interface format, at least one of the second and third interface formats being dissimilar from the first interface format.

2. The communication network of claim 1, wherein each of the first and second DSL units have three application ports.

3. The communication network of claim 1, wherein each of the first and second DSL units is configured according to the G.SHDSL standard.

4. The communication network of claim 1, wherein each of the first and second DSL units has two DSL ports each coupled to a DSL pair, the two DSL ports operating in M-pair mode.

5. The communication network of claim 1, wherein the second DSL unit is configured to use the received timeslots to generate the second signal and third signal by using one of timeslot range mapping and fractional timeslot mapping.

6. The communication network of claim 1, wherein the interface format for each of the plurality of application ports includes one of an Ethernet format, a G.703 format, and an Nx64k format.

7. The communication network of claim 6, wherein the first and second DSL units are configured to remove timeslot 0 of a signal received from a G.703 interface format application port, and generate timeslot 0 prior to passing a signal to the G.703 interface format application port.

8. The communication network of claim 6, wherein the first and second DSL units each further comprise an HDLC encoder/decoder configured to HDLC encode an Ethernet signal before timeslots are extracted from the Ethernet signal.

9. A digital subscriber line (DSL) unit, comprising:
a plurality of application ports; and
at least one DSL port, wherein the DSL unit is configured to receive a signal of an Ethernet interface format over one of the plurality of application ports, wherein the DSL unit is configured to remove start of frame and synch bytes from the Ethernet interface format signal and insert high-level data link control (HDLC) flags to identify the start and end of a frame; the DSL unit further configured to transmit the timeslots with the HDLC flags over the at least one DSL port, and use timeslots received over the at least one DSL port to generate at least one second signal of a dissimilar interface format from the timeslots received over the at least one DSL port.

10. The DSL unit of claim 9, wherein the plurality of application ports comprises three application ports.

11. The DSL unit of claim 9, wherein the DSL unit is a G.SHDSL unit.

12. The DSL unit of claim 9, wherein the DSL unit is configured to use timeslots received over the at least one DSL port to generate more than one second signals, each of the second signals formatted according to a different interface format.

13. The DSL unit of claim 9, wherein the DSL units is configured to use the received timeslots to generate at least one second signal of a dissimilar interface format by using one of timeslot range mapping and fractional timeslot mapping.

14. The DSL unit of claim 9, wherein the interface format for each of the plurality of application ports includes one of an Ethernet format, a G.703 format, and an Nx64k format.

15. The DSL unit of claim 14, wherein the DSL unit is configured to remove timeslot 0 of a signal received from a G.703 interface format application port, and generate timeslot 0 prior to passing a signal to the G.703 interface format application port.

16. The DSL unit of claim 9 further comprising:
a field programmable gate array (FPGA) configured to switch timeslots received over the at least one DSL port to one or more of the plurality of application ports to generate at least one second signal of a dissimilar interface format.

17. The DSL unit of claim 9 further comprising:
two DSL chipsets, each chipset coupled to one of the at least one DSL ports, wherein the two DSL chipsets are in a cascaded configuration operating in an M-pair mode.

18. A method of communicating in a network, the method comprising:
receiving a first signal at a first digital subscriber line (DSL) unit via an application port using a first interface format;
receiving a second signal at the first DSL unit via an application port using a second interface format;
extracting timeslots from the first and second signals;
inserting the extracted timeslots into a DSL frame in a specific order;
transmitting the DSL frame to a second DSL unit;
extracting the timeslots from the DSL frame in the second DSL unit; and
based on the specific order of the timeslots in the DSL frame, using the timeslots to generate a third signal of a dissimilar interface format in the second DSL unit.

19. The method of claim 18, wherein receiving a signal via an application port using a first interface format comprises receiving a signal of one of a G.703 format, an Nx64k format, and an Ethernet format.

20. The method of claim 19, wherein extracting timeslots from the first interface format comprises extracting timeslots from a G.703 frame.

21. The method of claim 20, wherein extracting timeslots from a G.703 frame includes terminating timeslot 0 from the G.703 frame.

22. The method of claim 20, wherein extracting timeslots from a G.703 frame includes disabling timeslot 16 in the G.703 frame.

23. The method of claim 19, wherein extracting the timeslots from the first interface format comprises:
removing start of frame and sync bytes from an Ethernet frame to form a stripped Ethernet frame; and
high-level data link control (HDLC) encoding the stripped Ethernet frame;
wherein transmitting the DSL frame to the second DSL unit includes transmitting the HDLC encoded Ethernet frame to the second DSL unit.

24. The method of claim 23, wherein HDLC encoding an Ethernet frame comprises:
appending a two byte cyclic redundancy check (CRC) to the stripped Ethernet frame;
examining the stripped Ethernet frame plus CRC for a continuous bit sequence of five ones;
inserting a zero at the end of each found sequence of five ones; and
inserting an HDLC flag at the beginning and end of the frame.

25. The method of claim 19, wherein using timeslots to generate at least one second signal of a dissimilar interface format comprises:
placing extracted timeslots in a time division multiplexed (TDM) byte stream;
extracting an HDLC frame from the TDM byte stream;

decoding the HDLC frame to form a stripped Ethernet frame; and prepending start of frame and sync bytes to the stripped Ethernet frame.

26. The method of claim 25, wherein extracting an HDLC frame from the TDM byte stream comprises searching for HDLC flags in the HDLC frame to identify the HDLC frame.

27. The method of claim 25, wherein decoding the HDLC frame comprises:

removing an HDLC flag from the start and end of the HDLC frame;

removing a zero inserted at the end of each sequence of five ones; and removing a two byte cyclic redundancy check.

28. The method of claim 18, wherein transmitting the DSL frame to a second DSL unit comprises transmitting timeslots as payload in DSL lines according to the G.SHDSL standard.

29. The method of claim 18, wherein transmitting the DSL frame to a second DSL unit comprises transmitting the DSL frame to a second DSL unit over two DSL pairs in M-pair mode.

* * * * *